Oct. 7, 1952 J. R. MARTIN 2,612,671
TUBING SPIDER
Filed March 13, 1947 2 SHEETS—SHEET 1

JOHN R. MARTIN
INVENTOR.

BY Lester B. Clark
& Ray L. Smith
ATTORNEYS

UNITED STATES PATENT OFFICE 2,612,671

TUBING SPIDER

John R. Martin, Houston, Tex.

Application March 13, 1947, Serial No. 734,424

2 Claims. (Cl. 24—263)

The invention relates to a tubing spider for wells which can be power operated in order to manipulate the tubing into and out of the well bore.

In the completion and production of oil and gas wells, it is usual to equip the well with a relatively small diameter string of pipe or tubing and in many wells it is necessary to periodically remove and reinsert this tubing. The gripping and releasing of long strings of tubing is a very laborious operation and the present invention relates to a tubing spider wherein the slips grip the tubing to support it in intermediate position while it is being removed and reinserted but will be power operated so as to speed up the operations.

It is one of the objects of the invention to provide a power operated tubing spider which may be utilized on a well by passing the body of the spider, the adapter bushing therein, and the slip assembly about the tubing at will.

Another object of the invention is to provide an adapter bushing for tubing spider so that both the bushing and the spider may be moved laterally about the tubing but wherein the adapter bushing is rigidly supported by the spider body so as to avoid distortion thereof.

Another object of the invention is to provide a tubing spider and adapter bushing therefor to support the tubing with slips in the well, wherein both the body and bushing are slotted but arranged to interfit with the slots in diametrically opposed position so that the body generally supports the bushing and the load of slips and tubing thereon.

Another object of the invention is to provide an adapter bushing for tubing spiders which is slotted to pass about the tubing but which is arranged with interfitting portions to be received in the body so that the bushing will rigidly support the slips and tubing.

Another object of the invention is to provide a set of power operated slips for tubing spiders in combination with a slotted adapter bushing and spider body.

Other and further objects of the invention will be readily apparent when the following description is considered in connection with the accompanying drawings, wherein.

The power mechanism disclosed herein is shown and claimed in detail in my prior copending application, Serial Number 673,866 filed June 1, 1946, now abandoned, for a Hydraulically Operated Slip Mechanism, whereas, the present invention shows such power mechanism as applied to a tubing spider.

Figure 1:
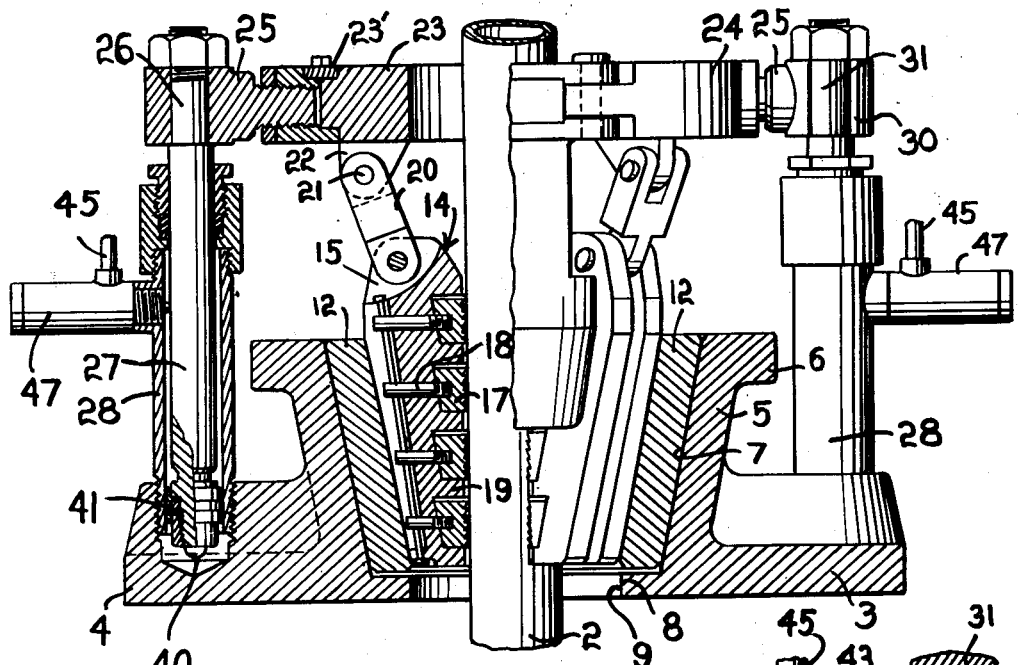
Fig. 1 is a vertical sectional view of the tubing spider in operation with the slips supporting the tubing in the adapter bushing.

In Fig. 1 the tubing 2 extends into the well and for purposes of description may be considered as being removed.

The spider for supporting the tubing includes a body portion 3 which has an extended base 4 which is positioned upon the well structure. This body has upwardly directed extension 5 having the flanges 6 thereon and the tapered bowl 7. An inwardly extension 8 provides an opening 9 through which the tubing is moved.

In order to support the tubing in the spider, an adapter bushing 12 is arranged to be deposited in the bowl 7 and such bushing in turn forms the slip receiving portion or bowl 12.

The assembly 14 is made up of a plurality of slip segments 15, each of which carries a number of pipe gripping jaws 17 held in position by a pin 18 slidable in a slip body 19.

Figure 5:
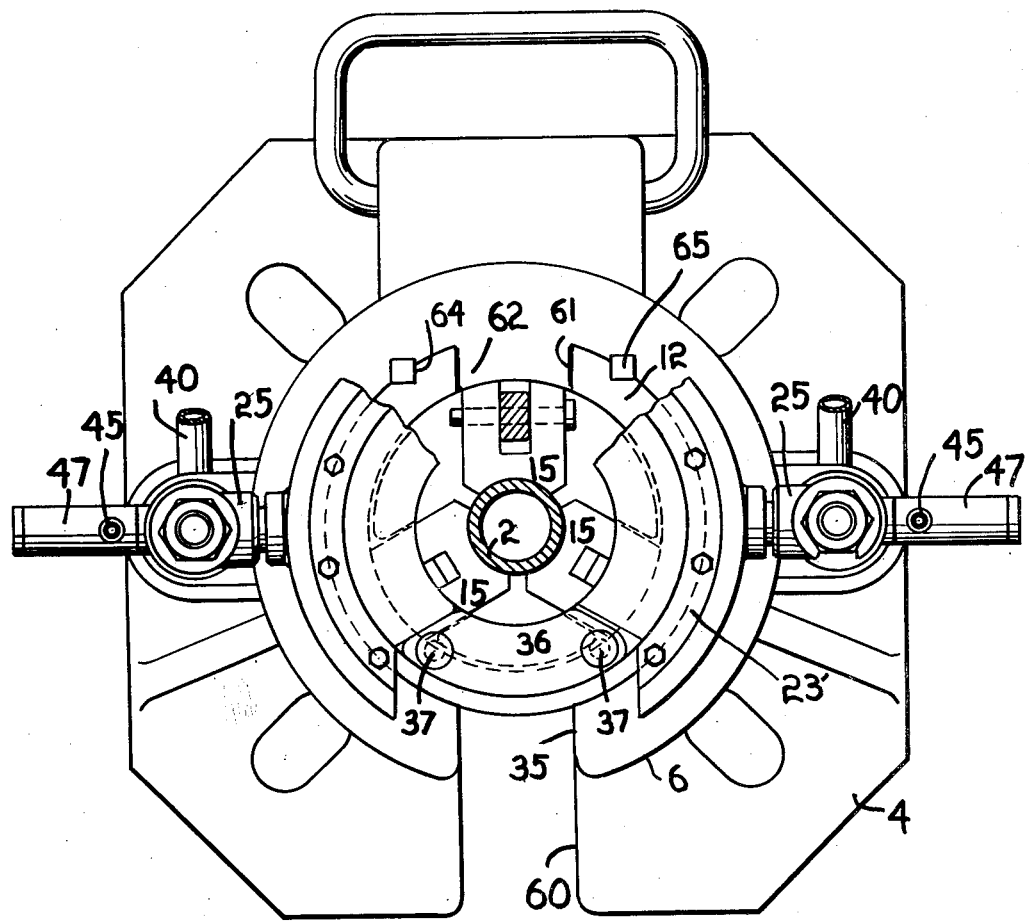
Fig. 5 is a top plan view looking down on the power operated tubing spider with certain parts broken away and showing the tubing in sections.

The slip segments 15 are supported by the links 20 pivoted at 21 to the lugs 22 on the lower face of a rotatable slip ring 23. This ring 23 has been dropped into a central opening of a slip carrier 24 and is confined by a hold-down plate 23'. This carrier 24 is in turn supported upon a pair of opposed nipples 25 which are adjustably threaded into the carrier. The left end nipple is fitted over the upper portion 26 of a plunger 27 slidable in a cylinder 28 mounted on a spider base 4. The right hand nipple 25 has an opening 30 therein so as to pass about the upper portion of the right hand plunger 31 so that when the plungers are raised, the entire slip assembly may be pivoted about the plunger 26 so as to swing laterally away from its position above the spider and the adapter bushing 12. In order to permit this swinging movement, the carrier 24 has a slot or opening 35 therein as seen in Fig. 5 and the same is true of the slip supporting ring 23. The opening in the ring 23 is closed by a gate 36. This gate is held in position by the pins 37, either one or both of which may be removed so as to open the rings for lateral swinging movement of the assembly. The slip segments 15 are so arranged that they may pass around the tubing during this swinging movement, as best seen in Fig. 5.

An inlet openings 40 in the bottom of each of the cylinders 28 allows the introduction of fluid under pressure, such as air, gas, or a non-compressible liquid, so that pressure below the packing portions 41 on the lower part of each of the plungers 26 and 31 causes the plungers and all the connected slip assembly to be raised so as to withdraw the slips from the adapter bushing 12.

Figure 2:
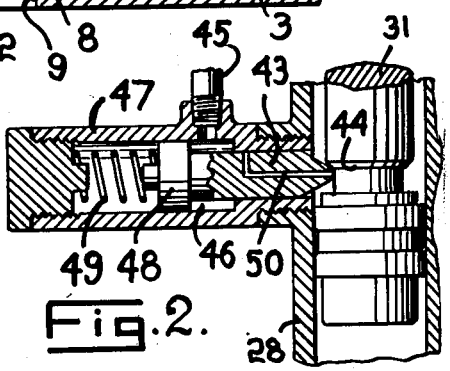
Fig. 2 is a broken detailed sectional view of the power operating mechanism for the slips.

In order to avoid maintaining hydraulic pressure in the cylinders, a latch pin 43 is best seen in Fig. 2 as fitting into the recess 44 formed in the periphery of the plunger. This latch holds the plunger in raised position but can be retracted by the application of suitable pressure fluid through the pipe 45 leading into the chamber 46 into a housing 47 about the pin 43. This pressure exerted against the enlarged portion 48 compresses a spring portion 49 and withdraws the pin. A leak port 50 in the pin is uncovered when the pin is retracted so as to allow the pressure to escape from the plunger 46 after the chamber has dropped down.

One of the principal features of the present invention is the arrangement of the spider body with the lateral slot 69 therein so that the body may be moved laterally to enclose the tubing 2 within the bottom opening 9 in the body.

Figure 3:
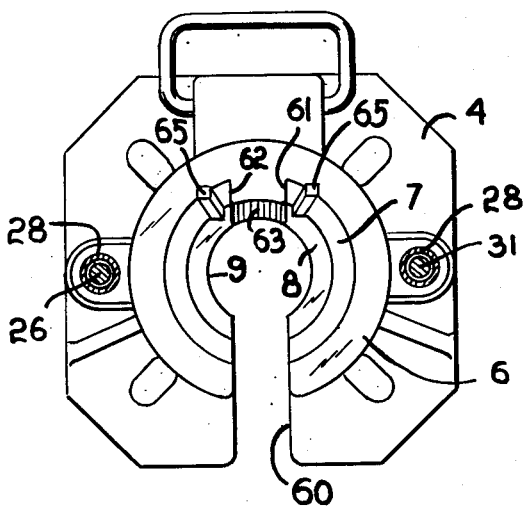
Fig. 3 is a transverse sectional view through the power mechanism illustrating the spider body with the adapter bushing removed.
Figure 4:
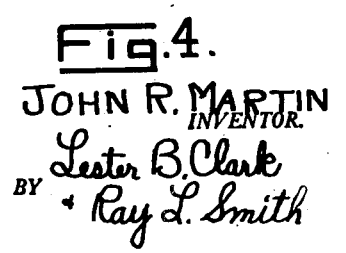
Fig. 4 is a top plan view looking down on the adapter bushing.

Fig. 3 shows this construction and illustrates the bottom flange 8 and the tapered slip bowl 7 which is arranged to receive the adapter bushing 12. This bushing is of peculiar configuration as seen in Fig. 4 in that it is slotted at 61 so that it too may be passed around the tubing 2 and dropped into position in the slip bowl 7. In order to insure proper alignment of the bushing 12, a relatively wide key 62 has been formed along the interior surface of the slip bowl 7 and is of a width to be received within the slot 61 of the bushing. This key is downwardly and inwardly inclined as shown by the shade lines 63 in Fig. 3. In order to further insure the proper alignment of the adapter bushing and to prevent its rotation relative to the spider, the V grooves 64 have been formed therein on the outer surface on each side of the slot 61 and these grooves are arranged to fit over the keys 65 affixed in the slip bowl 7 on each side of the wide key 62. Fig. 3 shows the keys with the adapter bushing removed, whereas Fig. 5 shows the adapter bushing in position, fitting all three of the keys.

The particular advantage of this construction resides in the fact that the spider body is quite massive and arranged to support the heavy load of the tubing. Such load might spring the adapter bushing 12 and allow settling of the slips therein unless said adapter bushing is firmly supported. The arrangement of the keys 65 therefor hold the adapter bushing firmly in position while the key 62 aligns the bushing with the spider bowl. In this manner, the greater the load of the tubing carried by the slips, the greater will be the load supported by the bushing and the spider body in combination, but the load is transmitted from the bushing to the spider body. The opposite arrangement of the slots 60 and 61 in the body and the bushing respectively distributes this radial thrust so that the bushing tends to prevent expansion of the body, and the body, where it is solid, tends to support the bushing and prevent it from expansion. In other words, the two cooperate together.

The rotatable arrangement of the slip supporting ring 23 permits the tubing to be rotated if desired without causing damage to the links 20 or other portions.

Broadly it seems obvious that a simple and economical power operated mechanism has been provided for tubing spiders by the provision of removable parts which can be positioned about the tubing while it is in the well bore and removed from the tubing at will.

What is claimed is:

1. In a tubing spider for wells, the combination of a spider body having a downwardly and inwardly tapered opening therethrough forming a bowl, a lateral slot through the side wall of said body and said bowl, a key of substantially the width of said slot extending inwardly into said opening and tapered downwardly and inwardly substantially concentrically with said bowl, a bushing tapered inwardly and downwardly to fit within said bowl and inwardly of the same dimensions and taper as said key, a lateral slot through the side wall of said bushing of a width to snugly receive said key therein when said bushing is fitted within said bowl, a non-circular cross-section keyway means in said bushing and bowl on either side of said bushing slot and adjacent thereto, and a non-circular key means of substantially the cross-section of said keyway means to fit within each keyway means to prevent said bushing from becoming sprung when supporting substantial loads extending through said opening and bearing upon said bushing.

2. In a tubing spider for wells, the combination of, a spider body having an opening therethrough forming a bowl, a lateral slot through the side wall of said body and said bowl, a key of substantially the width of said slot extending inwardly into said opening and tapered downwardly and inwardly, a bushing to fit within said bowl and being inwardly of the same dimensions and taper as said key, a lateral slot through the side wall of said bushing of a width to snugly receive said key therein when said bushing is fitted within said bowl, a non-circular cross-section keyway means in said bushing and bowl on either side of said bushing slot and adjacent thereto, and a non-circular key means of substantially the cross-section of said keyway means to fit within each keyway means to prevent said bushing from becoming sprung when supporting substantial loads extending through said opening and bearing upon said bushing.

JOHN R. MARTIN.

REFERENCES CITED

The following references are of record in the file of this patent:

UNITED STATES PATENTS

| Number | Name | Date |
| --- | --- | --- |
| 1,659,783 | Pearce | Feb. 21, 1928 |
| 1,834,597 | Johansen | Dec. 1, 1931 |
| 1,847,087 | Greve | Mar. 1, 1932 |
| 1,878,372 | Box | Sept. 20, 1932 |
| 2,090,854 | Timbs | Aug. 24, 1937 |
| 2,231,923 | Koen | Feb. 18, 1941 |
| 2,340,597 | Kelley | Feb. 1, 1944 |